(No Model.) 2 Sheets—Sheet 2.
A. C. & J. D. TOWER.
CULTIVATOR.
No. 399,296. Patented Mar. 12, 1889.
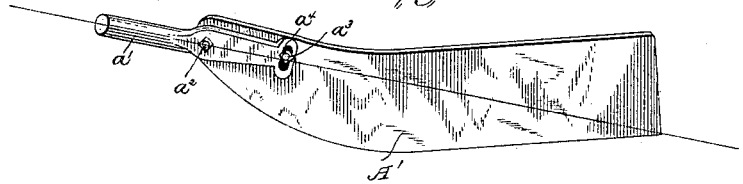
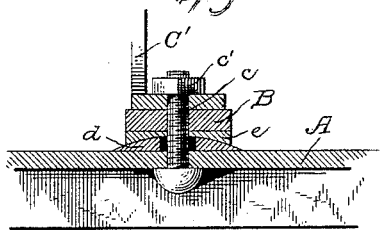
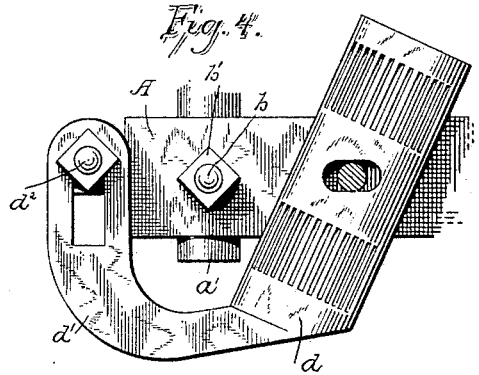
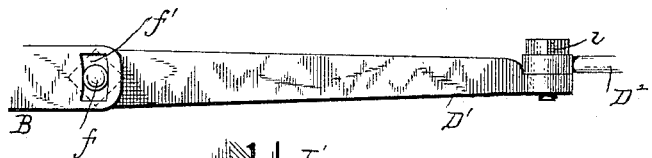
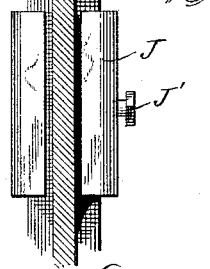
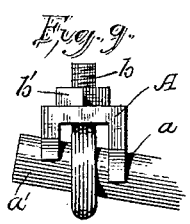
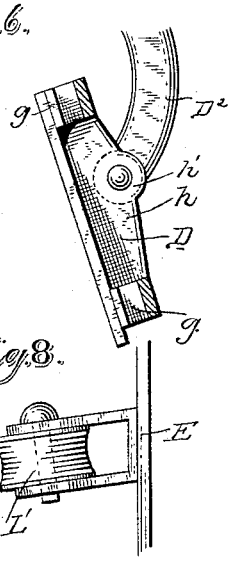
Witnesses:
Preston Phelps
Frank L. Dyer
Inventors:
Augustus C. Tower
Justus D. Tower
By Geo. W. Dyer
Attorney

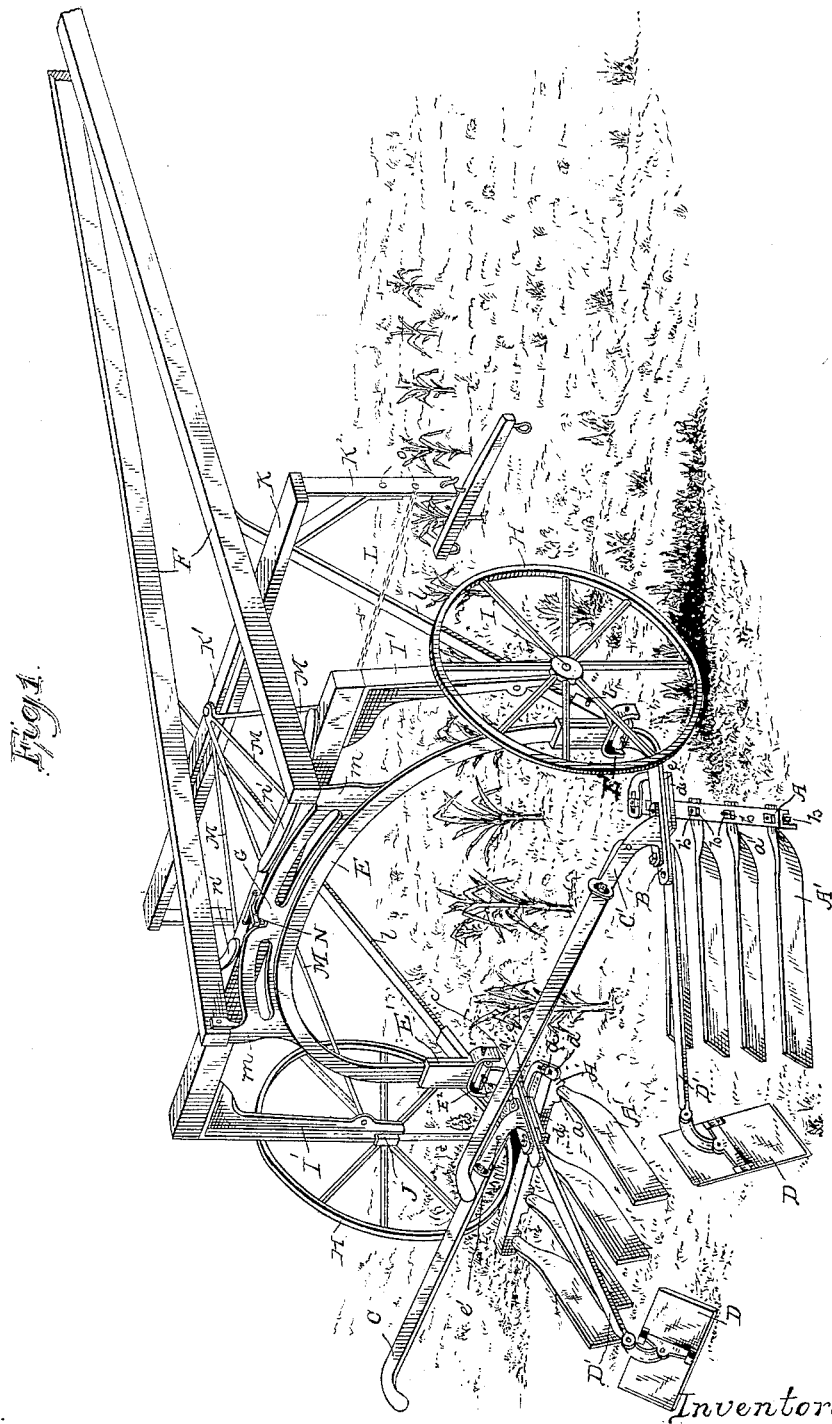

UNITED STATES PATENT OFFICE.

AUGUSTUS C. TOWER AND JUSTUS D. TOWER, OF MENDOTA, ILLINOIS.

CULTIVATOR.

SPECIFICATION forming part of Letters Patent No. 399,296, dated March 12, 1889.

Application filed July 29, 1887. Serial No. 245,613. (No model.)

*To all whom it may concern:*

Be it known that we, AUGUSTUS C. TOWER and JUSTUS D. TOWER, citizens of the United States, residing at Mendota, in the county of La Salle and State of Illinois, have invented certain new and useful Improvements in Cultivators; and we do hereby declare the following to be a full, clear, and exact description of the invention, which will enable others skilled in the art to which it appertains to make and use the same.

This invention relates to a cultivator particularly adapted for corn planted in narrow furrows, where it is designed to destroy the weeds, &c., at the same time drawing the earth more closely to the stalks on either side, without injury to the roots of the plants, and thus finally to place the earth in good condition and clear of weeds in ridges having the plants in the center, even where the rows are not very straight or the plants in very regular line in the furrows.

This cultivator in some respects is an improvement upon that described in our patent, No. 295,080, granted March 11, 1884, but differs materially in the construction and arrangement of various parts and in the mode of operation.

The essential idea of this cultivator is such a construction as will give great strength where the same is demanded with little weight, and such a construction as to have the two gangs of knives, under the will of the plowman, change their directions to a certain extent without regard to the direction of travel of the team, so that the plowman may cultivate all the plants regularly when they are not in line in the furrow or when the furrow is irregular in direction. This is accomplished by pivoting the gangs of knives to their beams so that each has an independence of motion, in having their gangs of knives secured rigidly to the pole, so that the normal direction of their forward movement is in line with the pole, and in placing the pivot for the axle at a point on the pole considerably in advance of the wheels, so that the wheels are dragged behind the pivot and have considerable freedom of direction of movement independent of the direction of movement of the team. By this construction the gangs of knives become rudders for the wheels, and either being pressed more deeply into the ground than the other changes the direction of the wheels, and therefore the rear end of the machine is moved to one side or the other without disturbance of the forward direction of the team. The means employed to effect these purposes and the peculiar construction of some of the parts employed constitute the novelties for which we seek a patent.

For the better understanding of our invention reference should be had to the accompanying drawings, in which—

Figure 1 is a perspective of the machine viewed from the rear, and Figs. 2 to 9 are details of portions of the same.

A A are the knife-heads, which are identical in construction, and which are made of double-angle shape in cross-section, open at the bottom, and provided with notches $a$ both in the front and rear flanges to receive the shanks $a'$ of the curved knives A', the said front flanges being of less depth than the rear flanges, in order to give the knives a downward rear projection, as in the patent before named. The tops of these knife-heads are perforated in transverse line with the notches $a$ to receive the shanks of the ring-bolts $b$, through the eyes of which the shanks $a'$ of the knives A' extend, and these ring-bolts are screw-threaded, so that when the knives have been adjusted to place they may be securely fastened by the nuts $b'$, as in the patent before named. The knives are set at a right angle to the knife-heads, and the latter are secured to the plow-beams B B at an angle, so that the rear ends of the knives are brought nearer to the center line of the machine than their front ends, and their shanks being round they may be set at any angle to a vertical line desired, and their cutting-edges are adjusted toward a common center from the right and left, respectively, all as in the patent before named.

It will be observed that no change has been made in the construction of the knife-heads and the manner of setting the knives; but special attention is called to the knives, which should be so formed that a straight line drawn through the longitudinal center of the shank will extend exactly to and touch the rear lower point of the knife, as shown in Fig. 2.

It is a fact demonstrated by practical experiment that no other shaped knife can be turned on the shank without raising or lowering the lower point of the knife; but if constructed as above it can be turned so as to make its cutting-edge stand at any angle without changing the vertical plane of the point. This is important, for it enables the knife to be turned for any cut and still present the whole face of the blade for cutting purposes in any position.

We have further improved upon the construction of the knives, as shown only by the detail Fig. 2, by making the blade separate from its shank and uniting the two, so that the blade can be easily adjusted and removed when occasion requires it. The shank $a'$ is tenoned on one side, so as to extend over onto the blade, and the two are secured together by a bolt, $a^2$, near the front end of the blade and by a bolt, $a^3$, working in a slot, $a^4$, in the rear end of the shank, whereby the position of the blade can be changed to bring its rear lower point in line with the center of the shank, as before explained. This construction is of considerable importance, because in having a knife repaired or sharpened the blacksmith sometimes fails to set it on a line with the other knives, and besides it sometimes springs or warps in heating; but by being adjustable upon the shank, as above described, it can be very readily set in the proper position. Each knife-head A is secured at an angle to its respective beam B by a vertical bolt, $c$, with a tightening-nut, $c'$, on the upper end. This bolt $c$ passes through two plates, $d$ and $e$, between the knife-head and beam. The upper plate, $e$, which is secured to the under side of the beam, has a corrugated concave surface, which receives the corrugated convex surface of the plate $d$, which rests upon the knife-head, and this last-named plate has a slotted hole for the bolt $c$. By means of these two plates constructed and fitting together in this way each gang of knives can be adjusted in the path of a circle and securely held in position with the aid of the bolt $c$ and its nut $c'$. The purpose of this line of adjustment is to change the inclination of the gang of knives to fit the surface of the ground during the different parts of the season as the ground is worked toward the row to form a ridge, and this adjustment of the knives is necessary from time to time as the season advances for securing surface cultivation while the contour of the surface changes. It will be observed in connection with this adjustment of the knives that by reason of the slotted hole in the plate $d$ only one bolt and bolt-hole are necessary, and that the bolt does not have to be moved out of a vertical line when changing the position of the gang of knives and securing it, which is much more convenient than if the bolt had to be moved or extra holes had to be drilled through the two plates $d$ and $e$.

The front end of each of the plates $d$ has an extension, $d'$, which is bent around until it reaches the inner end of knife-head, where it is slotted and fastened to the same by a bolt, $d^2$, passing down through the slot into the knife-head. By means of this attachment each knife-head with its gang of knives can be adjusted horizontally in the path of a circle, so as to widen or narrow the space between them and thereby change the direction of the cut of the knives at various angles to the line of draft, which is important and necessary at different seasons and under different conditions of the soil.

C C are handles which are bolted at their forward ends to the braces C' C', that are bolted to the beams B B. These handles should incline either to the right or to the left of the center of the machine, so as to enable the plowman to walk upon one side of the row, and are vertically adjustable by means of a slot and a bolt, $c^2$, at the upper ends of the braces C' C', as shown in Fig. 1.

D D are clod-crushing plates, which are suspended from the rear ends of the two arms D' D' back of the two gangs of knives. These arms D' D' are made from iron, or preferably from steel, so as to be flexible, to allow the clod-crushing plates to adjust themselves to the inequalities of the ground-surface, and at their forward ends are adjustably connected to the rear ends of the beams B B by bolts $f$, passing through slots $f'$ in the beams. This connection allows the arms with their clod-crushing plates to be laterally adjusted toward or away from each other to narrow or widen the intervening space.

The clod-crushing plates are each provided on the back with two loops or brackets, $g$ $g$, which receive the ends of a hanger, $h$, which is provided at its center with an ear, $h'$, to which is bolted the lower end of a curved hanger, $D^2$, which in turn is attached to the rear end of the arm D' and fastened thereto by the bolt $i$ and its nut. This means for suspending the plates D D enables them to be raised and lowered and adjusted at any desired angle of inclination to suit the surface of the ground and is more simple and convenient than the means employed for this purpose in the patent before named.

The ends of the hangers $h$ on the back of the plates are smaller than the loops of the brackets which receive them, and hence the plates have considerable play or oscillation as the machine is drawn over the ground and work with good effect upon the clods of earth.

The beams B B, to which the knife-heads and clod-crushing plates are attached, are connected at their forward ends by an arch or bow, E. This arch or bow is provided at each end with a yoke, E', and this yoke furnishes loose end bearings for a pin, $E^2$, which passes through a socket on the end of the beam, and a set-screw, $k$, passing through the socket, enables the beam to be adjusted sidewise upon the pin $E^2$. This manner of coupling the beams B B with the arch or bow E enables them, together with all of their attachments, to adjust themselves to the inequalities of the surface and to be raised, entirely free from the ground in turning at the ends of the rows or in passing over roads, and it furthermore enables the knife-heads, as well as the clod-crushing plates, to be moved nearer to or farther from the rows, as may be desired.

The arch or bow E is braced at its ends by two stay-rods, *l l*, which are bolted at their upper ends to the forked tongue F and extend down into sockets branching out from the yokes E′, wherein they are secured by set-screws *l* alike at the two ends of the arch or bow E. The two forks of the tongue F are at their rear ends bolted to the vertical arms *m m* of a crown-piece, G, which is bolted to the arch or bow E; but this crown-piece may be made integral with the bow. This manner of bracing the arch or bow E in connection with tongue F keeps the knives in line with the point of the tongue, regardless of the position of the team, as will be hereinafter understood.

H H are the wheels which support the machine, and these are vertically adjustable upon the arms I′ of the axle I to raise or lower the frame of the machine, so that the depth to which the knives will penetrate the ground may be adjusted or varied at will. The spindles upon which the wheels turn are secured in plates J J, which are grooved and fitted to slide upon the axle-arms I′ I′, that are made T shape in cross-section, and by means of the set-screws J′ J′ it can be seen how the wheels H H can be adjusted. At the points where the tongue F passes over the axle it has friction-rollers *n n*, which move upon curved plates *n′ n′*, secured upon the top of the axle, to avoid friction and allow the axle to have free play.

K is a draft-bar, which is pivoted to the center of a cross-bar, K′, bolted to the two forks of the tongue F. This draft-bar has a pendent bar, K², at each end suitably braced, as shown, and provided with a vertical line of perforations, *o*, so as to adjustably hang the whiffletrees therefrom at whatever elevation is desired, and to these pendent bars K² are attached the ends of a chain, L, which equalizes the draft, said chain passing around the pulley L′, suitably secured to the crown-piece G of the arch or bow E.

A group of four brace-rods, M M M M, two of which are secured to the axle I and the others to the axle-arms I′, as shown in Fig. 1, extend forward and come together at one point, where they are united, and are pivoted at this point to the cross-bar K′ by the same bolt that pivots the draft-bar. The effect of pivoting the axle and the draft-bar in this way, independent of the frame of the machine, is to enable the plows to be kept in their proper places, regardless of the position of the horses. In case the team does not keep in the proper direction, a pressure upon the proper handle forces the knives upon that side deeper into the earth, and thereby increases the resistance sufficiently to change the direction of the wheels and to overcome wrong direction of draft. These forces keep the wheels astride of the row, and are of special service in working the machine in irregularly-planted corn.

In turning at the ends of the rows or in conveying the machine over the road or to the field to be cultivated it is desirable that all side motion of the axle should be suspended, and to accomplish this a latch or key, N, is suitably hinged or pivoted to the axle I between its curved plates *n′ n′*, and adapted to drop into a notch, *m′*, at the center of the crown-piece G of the arch or bow E, so as to lock the axle and frame together.

The operations of the knives in this machine are substantially the same as those in the patent before named. As the machine moves over the ground, they operate to cut up the soil and carry it to the center about the hill, and the plates in their rear assist in pulverizing the soil and make it smooth.

Having thus described our invention, what we claim, and desire to secure by Letters Patent, is—

1. A cultivator provided with two independently-movable gangs of knives pivoted in the ends of an arch rigidly connected to the tongue and a pair of traction-wheels pivoted at a point in advance of the wheels, whereby the direction of the wheels and knives may be changed by pressure upon either gang of knives independently of the direction of movement of the team, substantially as described.

2. In a cultivator, the combination, with the plow-beams B, of a pair of spring-metal arms, D′, connected at their forward ends to said beams, and a clod-crushing plate, D, suspended from the rear end of each arm, substantially as described.

3. In a cultivator, the combination, with the plow-beams B, of a pair of arms, D′, adjustably connected at their forward ends to the beams by bolts *f*, passing through slots *f′* in said beams, and a clod-crushing plate suspended from the rear end of each arm, substantially as described.

4. In a cultivator, the combination, with the plow-beams B, of a pair of backward-extending arms, D′, connected at their forward ends to said beams, and a clod-crushing plate, D, suspended from the rear end of each arm by a hanger, D², attached to the arm by a bolt and nut, *i*, substantially as and for the purpose set forth.

5. In a cultivator, the combination of a pair of plow-beams, a gang of knives secured to each plow-beam, and means for changing the inclination of the gang to fit the surface of ground, consisting of the slotted and corrugated convex plate *d*, the corrugated concave plate *e*, fitting over the same, and the bolt *c* and its nut *c′*, all arranged substantially as described and shown.

6. In a cultivator, the combination of a pair of plow-beams, a gang of knives secured to each plow-beam, and means for adjusting each gang horizontally in the path of a circle, consisting of the plate $d$, with a slotted extension, $d'$, and a bolt, $d''$, passing down through the slot into the knife-head, substantially as described.

7. In a cultivator, the combination of an arch or bow, E, provided with yokes E' on its ends, and a pair of plow-beams, B, pivoted at their front ends in said yokes by means of a pin, E'', passing through a socket on the end of the beam, substantially as and for the purposes set forth.

8. In a cultivator, the combination of an arch or bow, E, provided with yokes E' on its ends, and a pair of plow-beams, B, pivoted at their forward ends in said yokes by means of a pin, E'', passing through a socket on the end of the beam, and each laterally adjustable upon its pin E'' by means of a set-screw, $k$, passing through its end socket, substantially as described and shown.

9. In a cultivator, the combination of an arch or bow, E, with yokes E' on its ends, a pair of plow-beams, B, pivotally and adjustably connected to said yokes, a forked tongue, F, rigidly connected at its rear ends to said arch or bow, and a pair of stay-rods, $l l$, extending from the tongue F down into the yokes E', substantially as described and shown.

10. In a cultivator, the combination, with the tongue F and the rigidly-connected arch or bow E, provided at its center on top with the notch $m'$, of the independently-working axle I, provided with the drop-latch N, substantially as and for the purpose set forth.

11. In a cultivator, the combination of a pivoted axle, I, provided with curved tracks $n' n'$, and a rigid forked tongue, F, provided with friction-rollers at the points where it crosses the axle, substantially as described and shown.

12. A cultivator-knife having its rear lower point in line with the center line of the shank, substantially as and for the purpose set forth.

13. A cultivator-knife with its blade made separate from the shank and adjustably connected thereto for the purpose of retaining or adjusting its rear lower point in line with the center line of the shank, while said shank may be rotated in its holder, substantially as and for the purpose set forth.

In testimony whereof we affix our signatures in presence of two witnesses.

AUGUSTUS C. TOWER.
    JUSTUS D. TOWER.

Witnesses:
 JOHN A. LAMBERTON,
 ADAM KLISSLA.